United States Patent
Landes et al.

(10) Patent No.: US 6,878,098 B2
(45) Date of Patent: Apr. 12, 2005

(54) SELECTIVE GOVERNOR USAGE FOR AN ENGINE

(75) Inventors: James W. Landes, East Peoria, IL (US); Mark E. Rettig, Decatur, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/085,553

(22) Filed: Feb. 28, 2002

(65) Prior Publication Data

US 2003/0186781 A1 Oct. 2, 2003

(51) Int. Cl.$^7$ .......................... B60K 41/04; F02D 31/00
(52) U.S. Cl. ........................................ 477/110; 123/257
(58) Field of Search ................... 477/110, 107, 477/111, 183, 203; 123/350, 352, 357

(56) References Cited

U.S. PATENT DOCUMENTS

| | | | | |
|---|---|---|---|---|
| 4,709,335 A | * | 11/1987 | Okamoto | 701/104 |
| 4,711,211 A | * | 12/1987 | Oshizawa et al. | 123/357 |
| 5,303,163 A | | 4/1994 | Ebaugh et al. | |
| 5,339,781 A | | 8/1994 | Osawa | |
| 5,417,193 A | | 5/1995 | Fillman et al. | |
| 5,845,619 A | | 12/1998 | Reichlinger | |
| 6,085,725 A | * | 7/2000 | Goode et al. | 123/357 |
| 6,092,504 A | * | 7/2000 | Barnes et al. | 123/357 |
| 6,113,643 A | * | 9/2000 | Weber et al. | 703/8 |
| 6,133,643 A | | 10/2000 | Lukich et al. | |
| 6,167,979 B1 | * | 1/2001 | Taylor et al. | 180/170 |
| 6,223,720 B1 | * | 5/2001 | Kramer et al. | 123/357 |
| 6,240,356 B1 | | 5/2001 | Lapke | |
| 6,260,647 B1 | | 7/2001 | Calamari et al. | |
| 6,286,987 B1 | | 9/2001 | Goode et al. | |

FOREIGN PATENT DOCUMENTS

| | | | | |
|---|---|---|---|---|
| JP | 358214656 A | * 12/1983 | | 123/527 |
| WO | WO 02/27173 A1 | 4/2002 | | |

* cited by examiner

Primary Examiner—Roger Pang
(74) Attorney, Agent, or Firm—Michael L Woods

(57) ABSTRACT

Apparatuses and methods for processing a signal in a moveable vehicle having an engine. A first combustion governor receives a first control signal and transmits a first governor signal operable to control an engine speed of the engine as a function of the first control signal. A second combustion governor receives the first control signal and to transmits a second governor signal operable to control an engine power production of the engine as a function of the first control signal. A first sensor determines a first characteristic of the vehicle transmits a first selecting signal as a function of the first characteristic. A governor-selecting device is coupled with the sensor to receive the first selecting signal. The governor-selecting device performs at least one of the following: receives the first control signal and transmits the first control signal to one of the first and second combustion governors as a function of the first selecting signal; and is coupled with at least one of the first and second governors to receive at least one of the first and second governor signals, and transmits one of the first and second governor signals as a function of the first selecting signal.

21 Claims, 4 Drawing Sheets

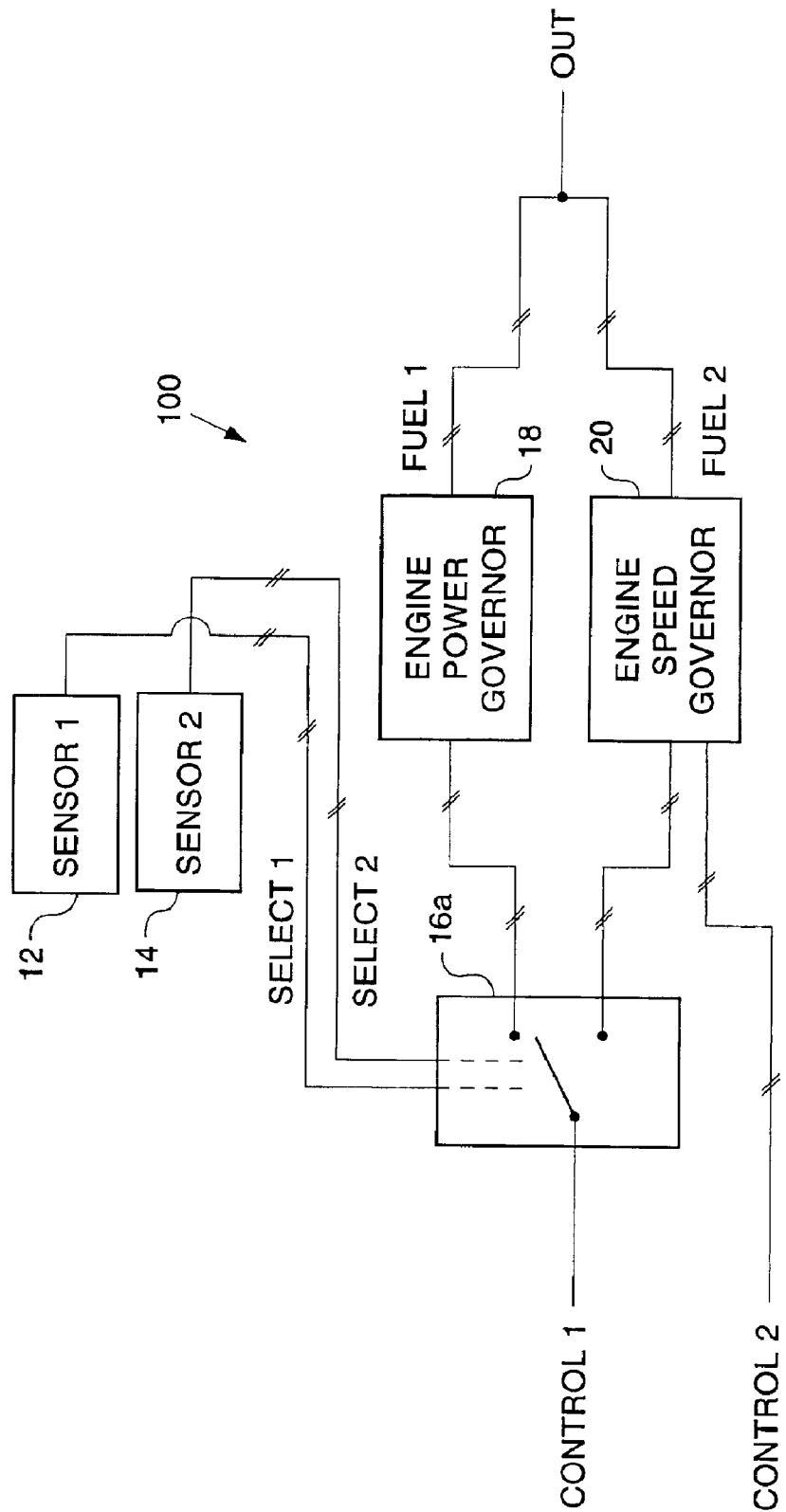

SELECTIVE GOVERNOR USAGE FOR AN ENGINE

TECHNICAL FIELD

This invention relates generally to engine governors, and more specifically to selective use of multiple governors for an engine.

BACKGROUND

Engine governors in conventional engine controllers typically receive a throttle command and cause a quantity of fuel to be delivered to a combustion chamber of an engine as a function of the throttle command. Most engine governors are configured to determine a quantity of fuel that will regulate either engine power or engine speed.

The vast majority of engine governors use the throttle command to control the power output of the engine. For example, depressing a throttle pedal fifty percent (50%) of its full range of travel results in a power production by the engine of fifty percent (50%) of its maximum power capability. Typically this type of engine governor is relatively easy to implement. Further, when a fuel governor that controls engine power is used on a on-highway truck, the engine governor usually produces smooth acceleration regardless of the load on the engine since the engine produces a constant torque (assuming the throttle command does not change). When an engine has a light load or no-load condition, however, these types of engine governors often will run up the engine speed to its maximum. This occurs because even a small throttle command, e.g., ten percent (10%), will cause the engine to produce a quantity of power in excess of what is required, thereby causing an acceleration of the engine.

Some engine governors use the throttle command to control the engine speed. For example, depressing the throttle pedal fifty percent (50%) of its full range of travel results in a desired engine speed of fifteen hundred (1500) revolutions per minute ("rpm's"). This type of engine governor avoids the run up problem mentioned above since engine speed is regulated, but has its own disadvantages. For example, when an on-highway truck using the engine governor that controls engine speed experiences a transmission upshift, the resulting change in engine speed will cause an undesired change in the engine output, since the governor will apply fuel to regain the engine speed lost during the upshift. This application of fuel results in an unfavorable "surge" of power on all upshifts.

Further, engine governors that control engine power are generally mutually exclusive with those that control engine speed. Typically the quantity of fuel needed at a given moment to control engine power is different than the quantity of fuel needed to control engine speed. Thus, a manufacturer of engine controls must choose between the two types of engine governors, including their inherent advantages and disadvantages.

SUMMARY OF THE INVENTION

The present invention provides apparatuses and methods for processing a signal in a moveable vehicle having an engine. A first combustion governor receives a first control signal and transmits a first governor signal operable to control an engine speed of the engine as a function of the first control signal. A second combustion governor receives the first control signal and transmits a second governor signal operable to control an engine power production of the engine as a function of the first control signal. A first sensor determines a first characteristic of the vehicle and transmits a first selecting signal as a function of the first characteristic. A governor-selecting device is coupled with the sensor to receive the first selecting signal. The governor-selecting device performs at least one of the following: receives the first control signal and transmits the first control signal to one of the first and second combustion governors as a function of the first selecting signal; and is coupled with at least one of the first and second governors to receive at least one of the first and second governor signals, and transmits one of the first and second governor signals as a function of the first selecting signal.

BRIEF DESCRIPTION OF THE DRAWINGS

FIG. 4 shows block diagram of an apparatus according to one embodiment of the invention.

DETAILED DESCRIPTION

Figure 1:
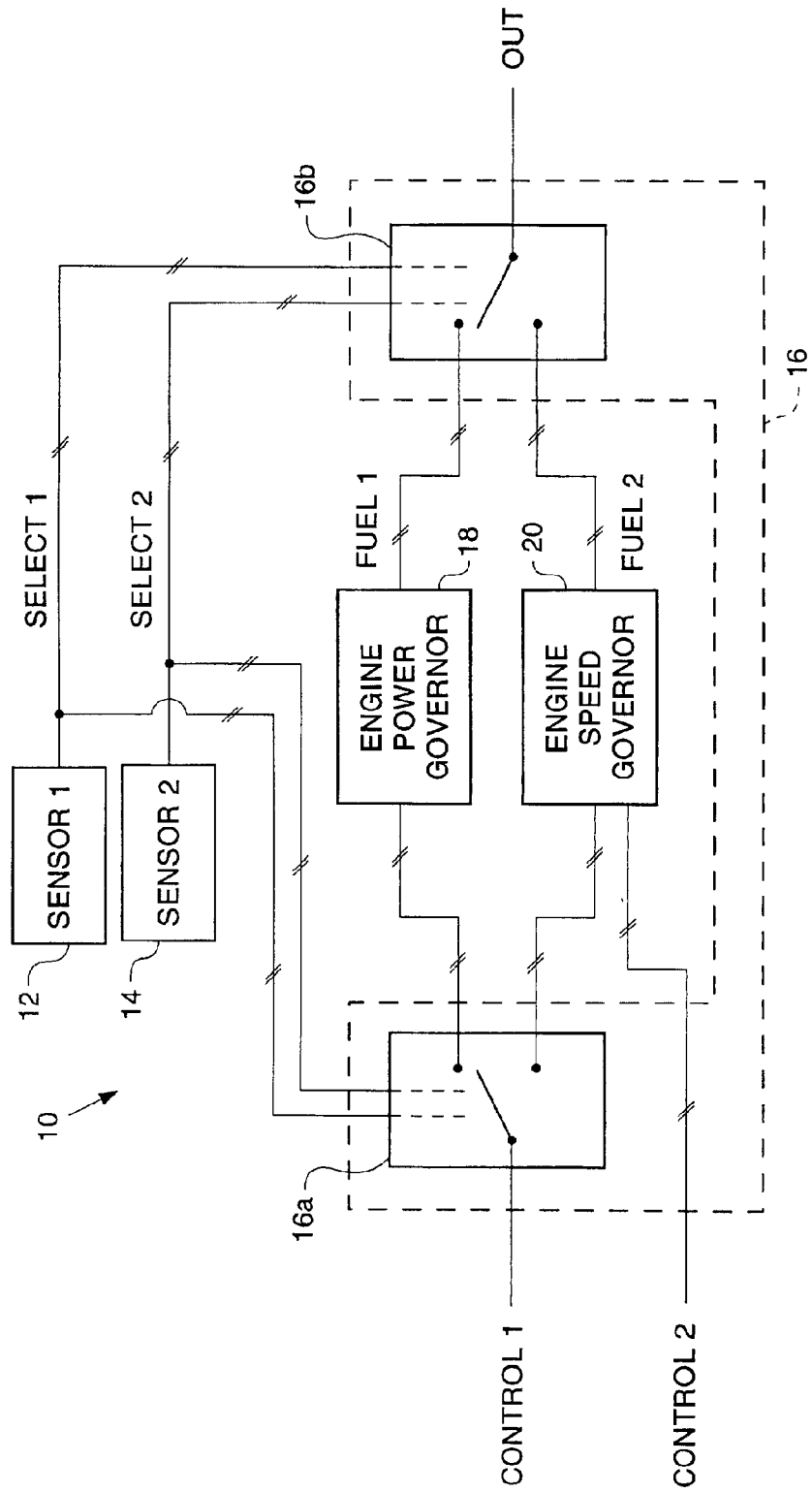
FIG. 1 shows a block diagram of an apparatus for processing a signal in a moveable vehicle having an engine according to one embodiment of the invention.

FIG. 1 shows a block diagram of an apparatus 10 for processing a signal in a moveable vehicle (not shown) having an engine (not shown) according to one embodiment of the invention. The apparatus 10 typically includes a first sensor 12 that detects or determines a first characteristic of the vehicle and transmits a first selecting signal SELECT1 as a function of the first characteristic. This first characteristic may be any of a variety of vehicle characteristics or conditions known to those skilled in the art. For example, the sensor may detect or determine whether the vehicle is in motion, such as by detecting wheel movement, whether a parking brake is set, whether a transmission of the engine is in neutral, or a variety of other characteristics known to those skilled in the art upon which a governor selection may be dependent, as is explained below or is known to those skilled in the art.

A second sensor 14 may also be used in some embodiments of the invention. The second sensor 14 typically detects or determines a second characteristic of the vehicle and transmits a second selecting signal SELECT2 as a function of the second characteristic. The second characteristic may also be any of a variety of appropriate vehicle characteristics known to those skilled in the art upon which a governor selection may be dependent, as is explained below or is known to those skilled in the art.

A governor-selecting device 16 may be coupled with at least one of the first and second sensors 12, 14 to receive or access the respective first and second selecting signals SELECT1, SELECT2. In embodiments of the invention, the governor-selecting device 16 may include one or more functional portions, e.g., first portion 16a and second portion 16b, as will be described below.

The first portion 16a of the governor-selecting device 16 also receives a first control signal CONTROL1 that is operable to control or affect some aspect of the combustion event or process of the engine. For example, in some embodiments of the invention, the first control signal CONTROL1 may be a throttle signal indicative of a desired quantity of fuel to be supplied to the engine. In other embodiments of the invention the first control signal CONTROL1 may be indicative of a desired quantity of air or an air/fuel mixture to be supplied to the engine. In these embodiments, the governor 18, 20 may be thought of as a combustion governor rather than a fuel governor.

In an embodiment of the invention, the first portion 16a of the governor-selecting device 16 transmits the first control signal CONTROL1 to one of at least two engine governors as a function of at least one of the first and second selecting signals SELECT1, SELECT2.

In general which engine governor receives the first control signal CONTROL1 may be determined using at least one of the first and second selecting signals SELECT1, SELECT2 by any of a variety of ways known to those skilled in the art: e.g., one signal may trump the other and be solely determinative, or both signals may need to have a predetermined condition.

For example, the first portion 16a of the governor-selecting device 16 may transmit the first control signal CONTROL1 to the first governor whenever one or both of the selecting signals SELECT1, SELECT2 indicate that the vehicle is in motion, when the parking brake of the vehicle is set, and/or when the transmission of the vehicle is in neutral. Similarly, the first portion 16a of the governor-selecting device 16 may transmit the first control signal CONTROL1 to the second governor whenever one or both of the selecting signals SELECT1, SELECT2 indicate that the vehicle is not in motion, when the parking brake of the vehicle is not set, and/or when the transmission of the vehicle is not in neutral.

More specifically, in one embodiment of the invention having two governors, the first selecting signal SELECT1 is indicative of whether the vehicle is in motion, and the second selecting signal SELECT2 is indicative of whether the transmission is in neutral. The first portion 16a of the governor selecting device 16 transmits the first control signal CONTROL1 to the second governor when the first selecting signal SELECT1 indicates that the vehicle is not in motion and second selecting signal SELECT2 indicates that the transmission is in neutral, e.g., the vehicle is parked or in a parked mode. Otherwise, the first portion 16a of the governor selecting device 16 transmits the first control signal CONTROL1 to the first governor.

In one embodiment of the invention, the first governor may be a fuel governor that controls engine power, e.g., an engine power governor 18, while the second governor may be a governor that controls engine speed, e.g., an engine speed governor 20. In other embodiments of the invention, the governors may be governors other than speed or power governors.

The engine power governor 18 typically regulates the power production of the engine as a function of the first control signal CONTROL1 by ways known to those skilled in the art. For example, each discrete value of the first control signal will produce a first fuel signal FUEL1 from the engine power governor 18 indicative of a desired quantity of fuel to be delivered to the combustion chamber of the engine. This desired quantity of fuel will be calculated to produce a particular power output by the engine, e.g., a fifty percent (50%) throttle signal will produce fifty percent (50%) of the maximum power production for that particular engine.

Although not shown, in other embodiments of the invention, the engine power governor 18 could receive additional control signals that would affect the value of the first fuel signal FUEL1.

In contrast, the engine speed governor 20 typically regulates the speed of the engine as a function of the first control signal CONTROL1 by ways known to those skilled in the art. For example, each discrete value of the first control signal will produce a second fuel signal FUEL2 from the engine speed governor 20 indicative of a desired quantity of fuel to be delivered to the combustion chamber of the engine. This desired fuel quantity will be calculated to produce a particular engine speed, e.g., a fifty percent (50%) throttle signal will produce an engine speed of fifteen hundred (1500) rpm.

In one embodiment of the invention, the engine speed governor 20 may receive a second control signal CONTROL2 indicative of a third characteristic of the vehicle, such as an actual engine speed signal. The engine speed governor 20 then transmits the second fuel signal FUEL2 as a function of both the first and second control signals CONTROL1, CONTROL2 by ways known to those skilled in the art.

In some embodiments of the invention, the second portion 16b of the governor-selecting device 16 may be coupled with the engine power governor 18 and the engine speed governor 20 to respectively receive the first fuel signal FUEL1 and the second fuel signal FUEL2. The second portion 16b of the governor-selecting device 16 may be also coupled with at least one of the first and second sensors 12, 14 to receive at least one of the first and second selecting signals SELECT1, SELECT2. The second portion 16b of the governor-selecting device 16 transmits one of the first and second fuel signals FUEL1, FUEL2 as a function of at least one of the first and second selecting signals SELECT1, SELECT2 by ways known to those skilled in the art. Typically, the second portion 16b of the governor-selecting device 16 works in harmony with the first portion 16a, transmitting the fuel signal FUEL1, FUEL2 from the engine governor that received the first control signal CONTROL1 from the first portion 16a of the governor-selecting device.

Figure 2:
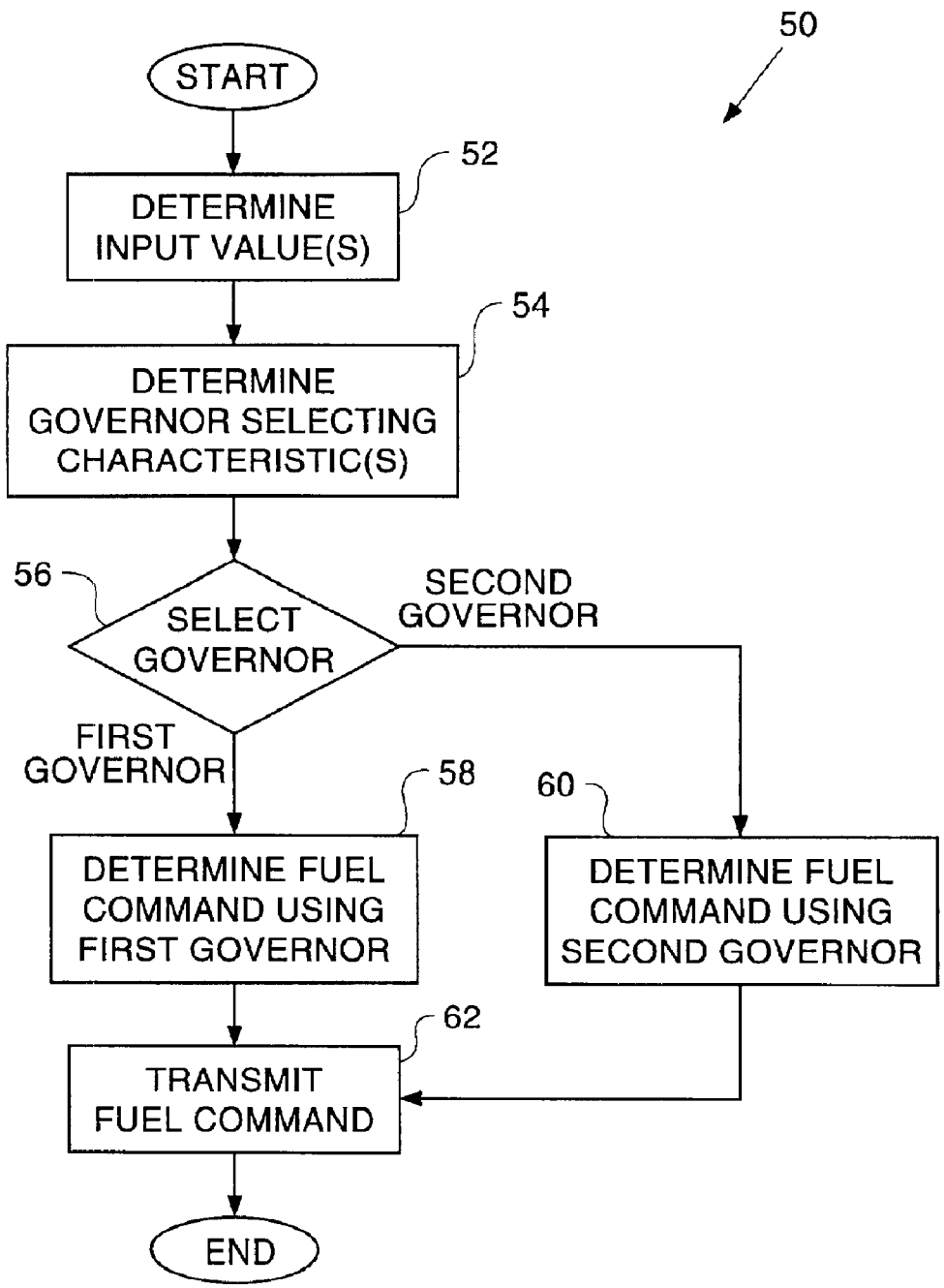
FIG. 2 shows a flow chart according to one embodiment of the invention.

FIG. 2 shows a flow chart 50 according to one embodiment of the invention. In block 52, at least one control input values, such as the first control signal CONTROL1, is determined.

In block 54, at least one characteristic used to select a governor is determined.

In block 56, based on the appropriate selecting characteristics, e.g., the characteristics indicated by SELECT1 and/or SELECT2, the first or second governor 18, 20 is chosen to act on the first control signal CONTROL1, and control is transferred to the appropriate block.

In block 58, if the first governor is chosen, the first fuel signal FUEL1 is determined using the configuration, e.g., logic programming, of the first governor.

In block 60, if the second governor is chosen the second fuel signal FUEL2 is determined using the configuration e.g., logic programming, of the second governor.

In block 62, whichever fuel signal FUEL1, FUEL2 that was determined by the respective governor, is transmitted.

Figure 3:
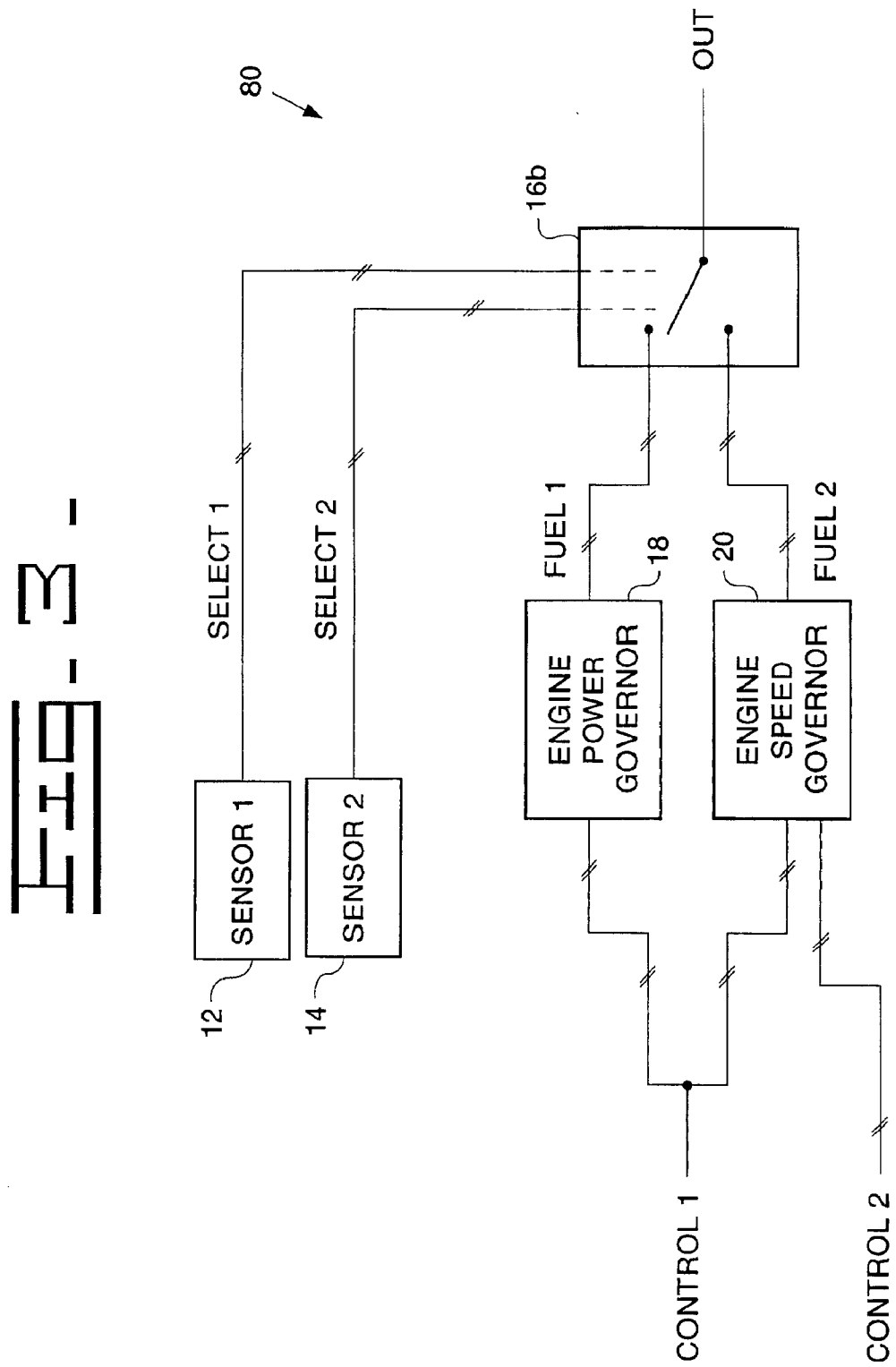
FIG. 3 shows block diagram of an apparatus according to one embodiment of the invention.

FIG. 3 shows block diagram of an apparatus 80 according to one embodiment of the invention. The apparatus 80 is similar to the apparatus 50 of FIG. 1 except that the first portion 16a of the governor-selecting device is omitted. Thus, the first control signal CONTROL1 is transmitted to both of the governors 18, 20, regardless of the status of the first and/or second selecting signals SELECT1, SELECT2.

In this embodiment, both governors 18, 20 may transmit their respective fuel signal FUEL1, FUEL2 to the second portion 16b of the governor selecting device 16, regardless of the status of the first and/or second selecting signals SELECT1, SELECT2. Only 1 of the two fuel signals FUEL1, FUEL2, however, is transmitted by the second portion 16b of the governor-selecting device 16 as described above. The apparatus 80 otherwise functions similarly to that of the apparatus 50, and will not be repeated.

In an alternative equivalent embodiment, only one of the governors 18, 20 may be activated so that only the activated governor 18, 20 transmits its respective fuel signal FUEL1, FUEL2. This may be accomplished, for example, by only delivering power to the governor that is to be activated or jumping to the portion of software that contains the appropriate governor as a function of at least one of the selecting signals SELECT1, SELECT 2.

FIG. 4 shows a block diagram of an apparatus 100 according to one embodiment of the invention. The apparatus 80 is similar to the apparatus 50 of FIG. 1 except that the second portion 16b of the governor-selecting device 16 is omitted. In this embodiment, the first control signal CONTROL1 also acts as an enabling signal to the respective governor 18, 20, enabling that governor by ways known to those skilled in the art to transmit its respective fuel signal. The governor that does not receive the first control signal CONTROL1 does not transmit its fuel signal. Thus, the second portion 16b of the governor-selecting device 16 is not needed. The apparatus 100 otherwise functions similarly to the apparatus 50 of FIG. 1, and will not be repeated.

Both the apparatuses 10, 80, 100 and the flow chart 50 may be implemented in hardware, e.g., electronic circuits, software, a.k.a. a temporary circuit, or some combination thereof by ways known to those skilled in the art. The description above is not intended to limit an embodiment of the invention to one or the other.

INDUSTRIAL APPLICABILITY

In operation, according to one embodiment of the invention, the apparatus 10, 80, 100 may be used to selectively activate a fuel governor 18, 20 for an engine of a truck. For example, an operator of the vehicle may set the throttle, which then transmits the throttle signal, as the first control signal CONTROL1.

The first and second sensors 12, 14 transmit signals indicative of whether the vehicle is in motion, such as by sensing movement by wheels of the vehicle, whether the parking brake is set, and/or whether the vehicle is in gear. The sensors may determine whether the vehicle is in motion by detecting wheel movement, or rotation by the output of the transmission, for example. The sensors may also determine their information from other sources, including reading the vehicle status from a data link used to communicate with the engine.

If the vehicle is in motion, the sensor signals SELECT1, SELECT2 cause the throttle signal to be sent to the engine power governor 18, which then transmits a fuel quantity signal FUEL1 that controls the power output of the engine as a function of the throttle position. This may provide for smooth shifting of the vehicle.

If the vehicle is not in motion, the sensor signals SELECT1, SELECT2 cause the throttle signal to be sent to the engine speed governor 20, which transmits a fuel quantity signal FUEL2 that controls the engine speed as a function of throttle position. This prevents run up of the engine speed while the vehicle is under light or no-load, which is presumed because the vehicle is not in motion. The driver of the vehicle may activate various accessories that only lightly load the engine that are used when the vehicle is not in motion, such as an air conditioner or heater, without worrying about excessive engine speed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for processing a signal in a moveable vehicle having an engine, comprising:

a first fuel governor operable to receive a throttle signal indicative of a desired throttle of the vehicle and to transmit a first fuel signal indicative of a first desired quantity of fuel to be supplied to the engine as a function of the throttle signal;

a second fuel governor operable to receive the throttle signal and to transmit a second fuel signal indicative of a second desired quantity of fuel to be supplied to the engine as a function of the throttle signal;

a first sensor operable to determine a first characteristic of the vehicle indicative of whether the vehicle is in motion, and to transmit a first selecting signal as a function of the first characteristic; and a governor-selecting device coupled with the sensor to receive the first selecting signal, the governor-selecting device operable to at least one of:

receive the throttle signal and to transmit the throttle signal to one of the first and second governor as a function of the first selecting signal; and be coupled with the first and second governor to respectively receive the first and second fuel signals, and operable to transmit one of the first and second fuel signals as a function of the first selecting signal, wherein the first selecting signal is indicative of whether the vehicle is in motion and the governor-selecting device is operable to at least one of:

transmit the throttle signal to the first governor as a function of the vehicle being in motion and to transmit the throttle signal to the second governor as a function of the vehicle not being in motion; and transmit the first fuel signal as a function of the vehicle being in motion and to transmit the second fuel signal as a function of the vehicle not being in motion.

2. The apparatus of claim 1 wherein the first characteristic of the motor vehicle comprises at least one of whether the vehicle is in motion, whether a parking brake is set, and whether a transmission of the vehicle is in neutral.

3. The apparatus of claim 1, further comprising:

a second sensor operable to determine a second characteristic of the vehicle and to transmit a second selecting signal as a function of the second characteristic; and the governor-selecting device is operable to be coupled with the second sensor to receive the second selection signal, and to at least one of:

transmit the throttle signal to one of the first and second governors as a function of at least one of the first and second selecting signals; and transmit one of the first and second fuel signals as a function of at least one of the first and second selecting signals.

4. The apparatus of claim 3 wherein one of the first selecting signal and the second selecting signal is indicative of whether the transmission is in neutral and the other of the first selecting signal and the second selecting signal is indicative of whether the vehicle is in motion; and the governor-selecting device is operable to at least one of:

transmit the throttle signal to the first governor as a function of the vehicle being in motion and transmit the throttle signal to the second fuel governor as a function of the vehicle not being in motion and the transmission being in neutral; and transmit the first fuel signal as a function of the vehicle being in motion and to transmit the second fuel signal as a function of the vehicle not being in motion and the transmission being in neutral.

5. The apparatus of claim 1 wherein the second fuel governor is further operable to receive a second control signal indicative of a third characteristic of the vehicle, and the second fuel governor is further operable to transmit the second fuel signal as a function of the second control signal.

6. The apparatus of claim 5 wherein the third characteristic of the vehicle comprises an engine speed.

7. The apparatus of claim 1 wherein the first fuel governor is operable to control engine power; and the second fuel governor is operable to control engine speed.

8. The apparatus of claim 1 wherein the moveable vehicle comprises a truck.

9. The apparatus of claim 1 wherein the first fuel governor the second fuel governor, and the governor-selecting device comprise circuits.

10. The apparatus of claim 9 wherein the circuits comprise at least one of hardware and software.

11. An apparatus for processing a signal in a moveable vehicle having an engine, comprising:

a first combustion governor operable to receive a first control signal and to transmit a first governor signal operable to control an engine speed of the engine as a function of the first control signal;

a second combustion governor operable to receive the first control signal and to transmit a second governor signal operable to control an engine power production of the engine as a function of the first control signal;

a first sensor operable to determine a first characteristic of the vehicle indicative of whether the vehicle is in motion, and to transmit a first selecting signal as a function of the first characteristic; and a governor-selecting device coupled with the sensor to receive the first selecting signal, the governor-selecting device operable to at least one of:

receive the first control signal and to transmit the first control signal to one of the first and second governor as a function of the first selecting signal; and be coupled with at least one of the first and second governors to receive at least one of the first and second governor signals, and operable to transmit one of the first and second governor signals as a function of the first selecting signal, wherein the first selecting signal is indicative of whether the vehicle is in motion and the governor-selecting device is operable to at least one of:

transmit the first signal to the first governor as a function of the vehicle being in motion and to transmit the first control signal to the second governor as a function of the vehicle not being in motion; and transmit the first governor signal as a function of the vehicle being in motion and to transmit the second governor signal as a function of the vehicle not being in motion.

12. The apparatus of claim 11 wherein the first control signal comprises a throttle signal.

13. The apparatus of claim 11 wherein the first and second governor signals comprise fuel signals indicative of at least one of a desired quantity of fuel, a desired quantity of air, and a desired quantity of an air/fuel mixture for the engine.

14. The apparatus of claim 11 wherein the first characteristic of the motor vehicle comprises at least one of whether the vehicle is in motion, whether a parking brake is set, and whether a transmission of the engine is in neutral.

15. The apparatus of claim 11, further comprising:

a second sensor operable to determine a second characteristic of the vehicle and to transmit a second selecting signal as a function of the second characteristic; and the governor-selecting device is operable to be coupled with the second sensor to receive the second selection signal, and operable to at least one of:

transmit the first control signal to one of the first and second governors as a function of at least one of the first and second selecting signals; and transmit one of the first and second governor signals as a function of at least one of the first and second selecting signals.

16. The apparatus of claim 15 wherein one of the first selecting signal and the second selecting signal is indicative of whether the transmission is in neutral and the other of the first selecting signal and the second selecting signal is indicative of whether the vehicle is in motion; and the governor-selecting device is operable to at least one of:

transmit the first control signal to the first governor as a function of the vehicle being in motion and transmit the first control signal to the second governor as a function of the vehicle not being in motion and the transmission being in neutral; and transmit the first governor signal as a function of the vehicle being in motion and to transmit the second governor signal as a function of the vehicle not being in motion and the transmission being in neutral.

17. The apparatus of claim 11 wherein the second combustion governor is further operable to receive a second control signal indicative of a third characteristic of the vehicle, and the second combustion governor is further operable to transmit the second governor signal as a function of the second control signal.

18. The apparatus of claim 17 wherein the third characteristic of the vehicle comprises an engine speed.

19. The apparatus of claim 11 wherein the moveable vehicle comprises a truck.

20. The apparatus of claim 11 wherein the first combustion governor, the second combustion governor, and the governor-selecting device comprise circuits.

21. The apparatus of claim 20 wherein the circuits comprise at least one of hardware and software.

* * * * *